United States Patent

[11] 3,610,884

| [72] | Inventors | Raymond J. Evans<br>Fairfield;<br>Raymond T. Cassidy, Stratford, both of Conn. |
|---|---|---|
| [21] | Appl. No. | 42,212 |
| [22] | Filed | June 1, 1970 |
| [45] | Patented | Oct. 5, 1971 |
| [73] | Assignee | Sperry Rand Corporation<br>New York, N.Y. |

[54] ELECTRIC FOOD WARMER
14 Claims, 7 Drawing Figs.

[52] U.S. Cl. .................................................. 219/439,
99/171, 126/246, 126/375, 219/386, 219/441,
219/462, 219/477, 219/530
[51] Int. Cl. ...................................................... F27d 11/02
[50] Field of Search.......................................... 219/439,
441–442, 447, 430, 432, 462, 530, 345, 476–480,
386–387; 126/246, 378, 375; 99/171

[56] References Cited
UNITED STATES PATENTS

| 2,436,097 | 2/1948 | Clarke | 126/246 X |
| 2,582,735 | 1/1952 | Alaj | 126/246 |
| 2,830,576 | 4/1958 | Torino et al. | 126/246 |
| 2,844,696 | 7/1958 | Custer, Jr. | 219/345 |
| 2,990,286 | 7/1961 | Clarke et al. | 99/171 |
| 3,034,499 | 5/1962 | Scavullo | 126/375 |
| 3,140,389 | 7/1964 | Windes | 219/447 |
| 3,385,952 | 5/1968 | Mix | 219/387 |

FOREIGN PATENTS

| 624,615 | 4/1927 | France | 219/447 |

Primary Examiner—Volodymyr Y. Mayewsky
Attorneys—Charles R. Miranda and Burtsell J. Kearns ABSTRACT: A portable electrical unit for maintaining precooked food at serving temperatures comprising an outer casing within which is arranged a food storage container. Means are provided to interconnect and suspend the container within the outer casing and provide an air chamber therebetween with means for heating the food storage container to a predetermined temperature housed within the air chamber. Thermal insulating barrier means are included for maintaining the precooked food contents of the inner container at said serving temperatures for extended periods of time after the heating means has been deactivated. Electrical interconnecting means are provided whereby a plurality of similar units may be utilized simultaneously in stacked relationship one upon the other.

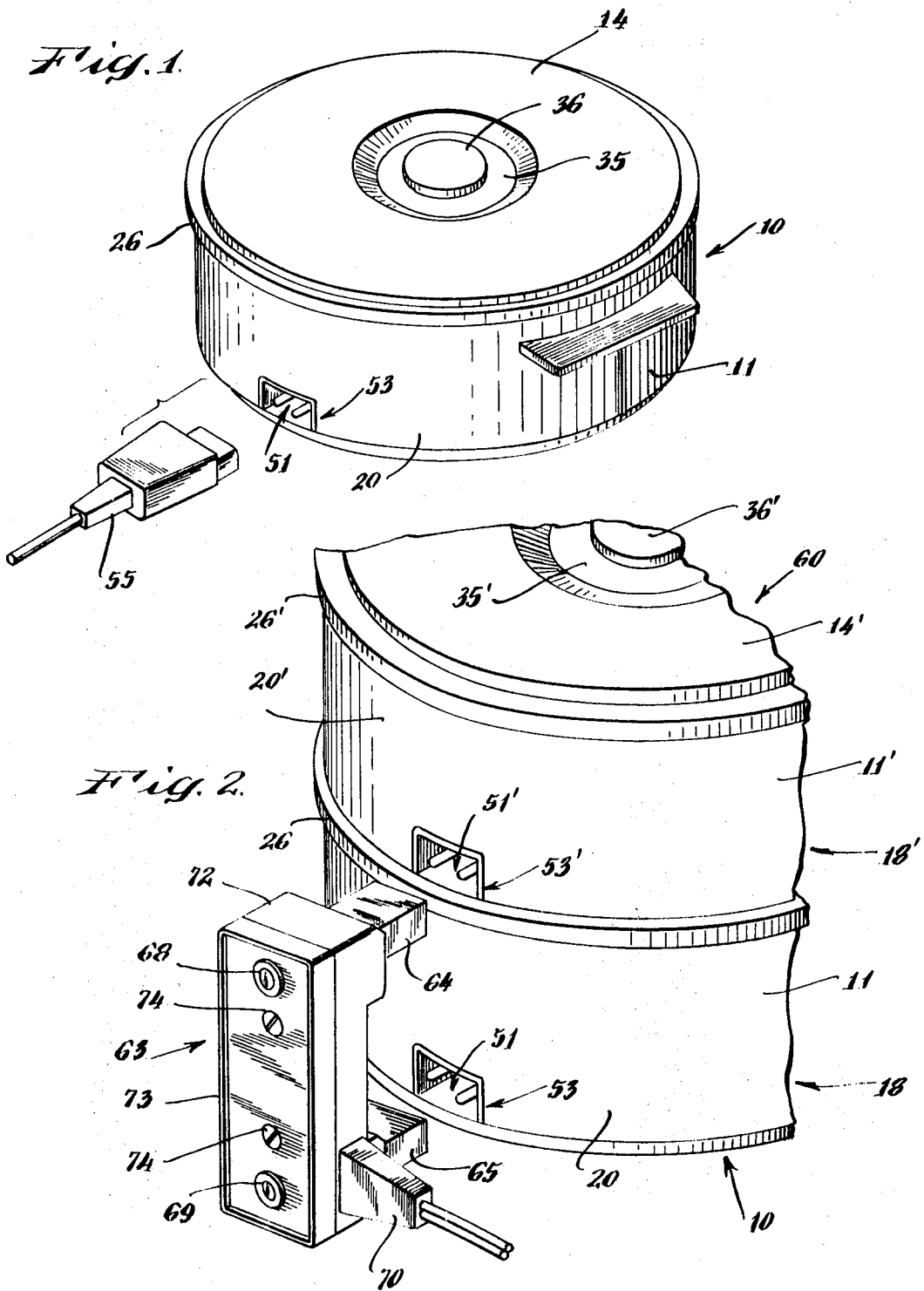

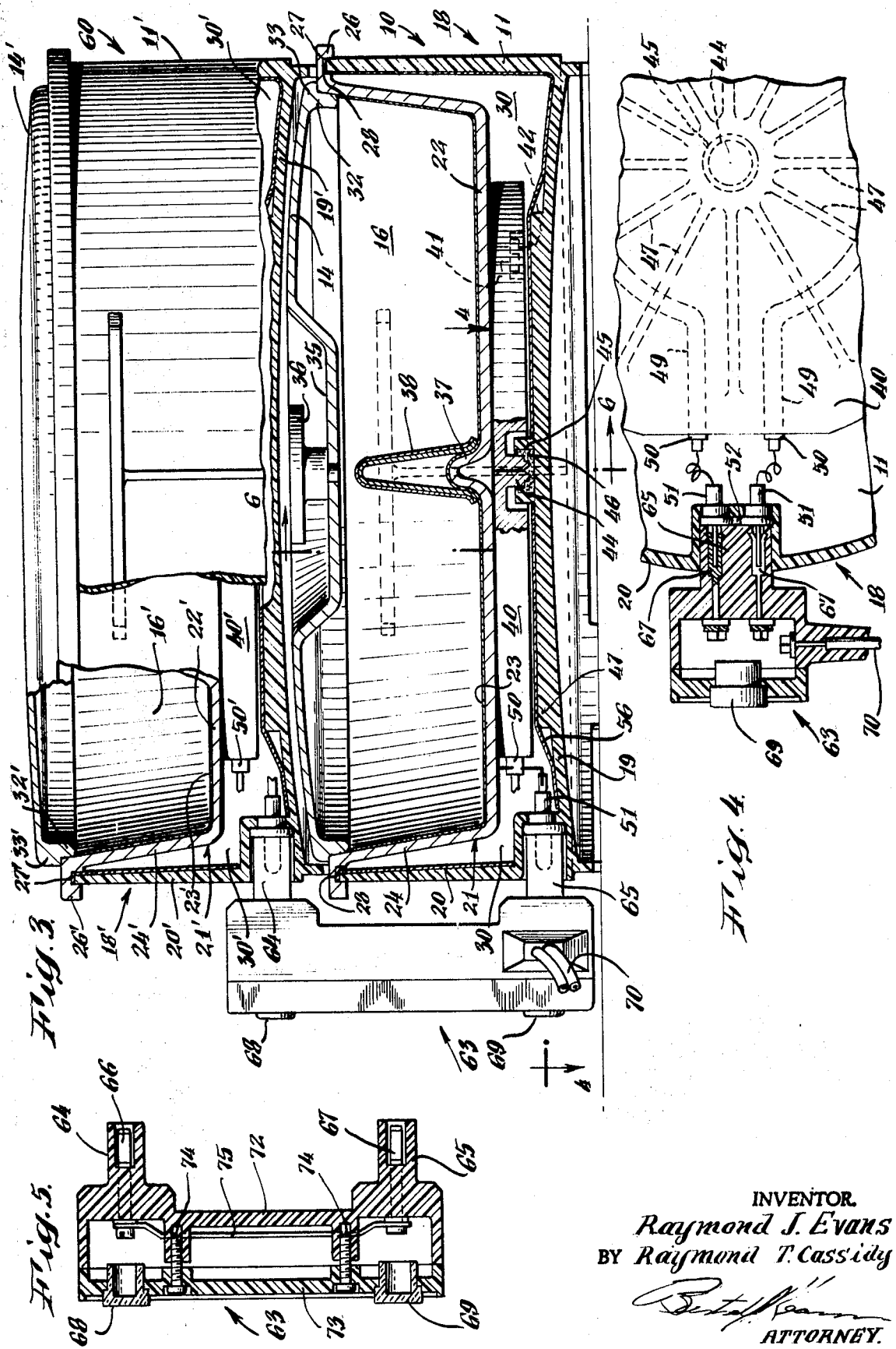

ELECTRIC FOOD WARMER

BACKGROUND OF THE INVENTION

This invention relates to new and useful improvements in portable electrical heating appliances and more particularly to appliances for maintaining precooked food at serving temperatures.

Portable electrical heating appliances such as heating devices for maintaining food at serving temperatures for use in the home are well known. Certain of these devices, such as those commonly referred to as baby food dishes include an inner food tray disposed within an outer container. A space is provided between the tray and outer container forming a reservoir for storing a hot fluid such as preheated water or the like for maintaining the contents of the food storage container warm. In other similar devices electrical heating elements are associated with the food storage tray whereupon connection of the unit to a suitable electrical outlet through a usual appliance cord the inner container is heated to a preselected temperature for maintaining the food warm. In still other food warming devices heat retention materials such as selected waxes, paraffins, oils or similar material are placed within the space between the inner and outer containers. Appropriate heating means are provided for melting the filler element and which filler element is of selected heat retention qualities that when in a liquid state the heat thereof is transferred to the inner casing to maintain the precooked food at selected temperatures until the heat is dissipated.

These known-type food warming and heating devices present certain inconveniences in use and manufacture. Among other problems the known devices utilizing electrical heating elements for maintaining the food at serving temperatures necessitate the continuous attachment of the unit to an electrical outlet for the repeated recycling of the heating element through operation of a thermostat to maintain the temperature of the food storage container at selected levels. Alternatively the fluid filled devices present relatively complex structures for manufacture. Most desirably a device of this nature for maintaining precooked food at serving temperatures must have the inherent convenience of use whereby the user may fill the storage container with a precooked heated food directly from the oven or range at a serving temperature. The device should have the capabilities for maintaining the temperature of the food within the serving temperature range for an extended period of time prior to serving without reconnection of the unit to an electrical outlet. It is further desirable that a unit of this type have inherent heat retention capabilities that the same may be placed on the dining room table or other serving area disconnected from the electrical outlet so that the appliance cord does not interfere with other implements on the table or otherwise detract from the table setting. It is also advantageous that a number of these units may be utilized at the same time whereby a variety of foods may be kept warm with a minimum of and without interfering with other activities of the user.

It is an object of the present invention to provide a novel appliance for maintaining precooked food at serving temperatures.

Another object is to provide a novel appliance having novel heat retention means for storing precooked food that is capable of retaining the heat and maintaining the contents thereof at serving temperatures for an extended period of time.

A further object is to provide a food warming device having a minimum warmup time and which device is capable of retaining the heat without connection to an outside electrical power source for an extended period of time and without the necessity of recycling the heating element.

A still further object is to provide a novel electric appliance for storing precooked food and maintaining the same at serving temperature which requires a minimum number of parts which facilitates in the assembly and maintenance thereof.

SUMMARY OF THE INVENTION

The present invention comprehends a novel electrical appliance having novel heating and heat retention means for maintaining precooked food at serving temperatures. In one embodiment the device comprises a unit having an inner food storage container disposed within an outer shell casing wherein interconnecting means are provided to connect the inner container to the shell and substantially suspend the container therein. In this manner the sidewalls and base portion of the container are spaced from adjacent similar wall portions of the shell to provide a sealed air chamber therebetween. Heating and heat distribution means of selected thermal mass are secured to the base of the container within the air chamber for heating the inner container to a predetermined level. Thermal barrier means provided between the distribution means and outer shell retain the temperature of the storage unit at a predetermined level for an extended period of time after the heating means is deactivated and disconnected from an external power supply. In addition electrical interconnecting means are provided whereby a plurality of similar appliances may be utilized simultaneously in stacked relationship one upon the other.

DESCRIPTION OF THE DRAWINGS

In the drawings:

FIG. 1 is a perspective view of a portable electric appliance embodying the present invention;

FIG. 2 is a fragmentary perspective view of the unit of FIG. 1 with a second similar unit stacked thereon and shows the electrical interconnecting plug means therefor;

FIG. 3 is a fragmentary partly cross-sectional view of the pair of units in stacked relationship and shows portions of the interiors thereof;

FIG. 4 is a sectional view taken on the line 4—4 of FIG. 3;

FIG. 5 is a cross-sectional view of the electrical interconnecting plug means;

Figure 6:
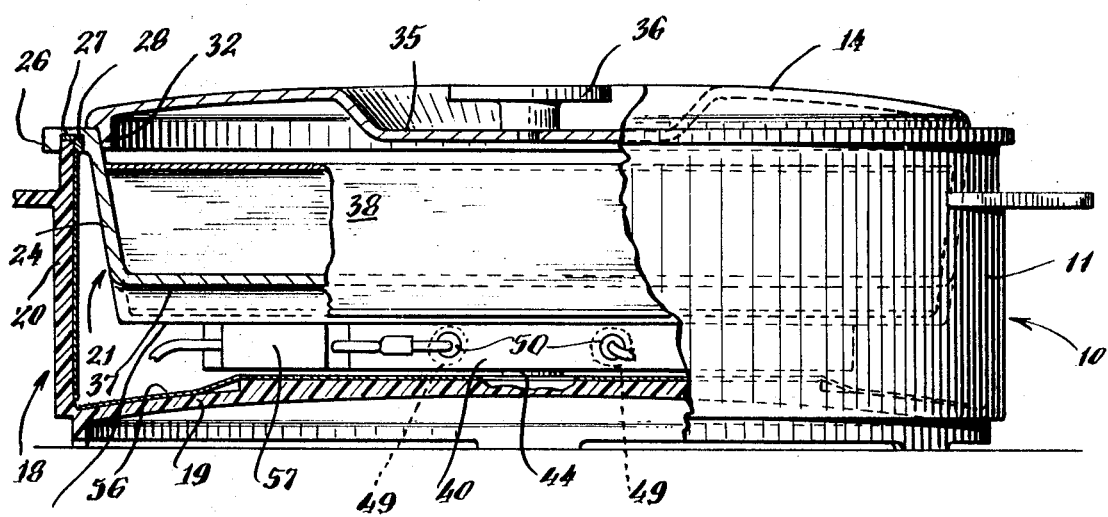
FIG. 6 is a sectional view taken on the line 6—6 of FIG. 3.

The above and other objects and advantages of the present invention will appear more fully hereinafter from a consideration of the detailed description which follows taken together with the accompanying drawings wherein one embodiment of the invention is illustrated.

DETAILED DESCRIPTION

Referring now to the drawings for a more detailed description of the present invention a portable electrical appliance unit which incorporates one embodiment thereof is generally indicated by the reference numeral 10 in FIG. 1. Unit 10 comprises a main casing 12 having a cover 14 and beneath which cover 14 is provided the food storage area generally indicated by the reference numeral 16 in FIG. 3.

Main casing 12 (FIGS. 1 and 3) comprises an outer circular shell casing 18 which is made from a suitable high-heat resistance thermoplastic material such as that sold under the trademark Noryl. Shell casing 18 includes a circular base 19 from the periphery of which rises the encircling outer sidewalls 20 of main casing 12. An inner food storage container of aluminum 21 is disposed within shell 18. The storage container 21 includes a circular base 22 and sidewalls 24 with the sidewalls 24 and base 22 being spaced from the adjacent sidewalls 20 and base 19 respectively of shell 18. A peripheral substantially right angle flange 26 is formed on the upper edges of sidewalls 24 of dish 21 and which flange 26 is provided with a groove 27 which is seated on the upper edge of the sidewalls 20 of shell 18. A suitable high-heat resistance adhesive (indicated at 28 in FIG. 3) such as a room vulcanized rubber adhesive such as that usually referred to as an RTV adhesive and having properties for retaining a bond over a wide temperature range and for withstanding contact with prolonged heat or immersion in water is provided in groove 27 and securely bonds flange 26 to shell 18. In this manner a sealed air chamber 30 is provided in unit 10 between the adjacent portions of container 21 and shell 18.

Cover 14 (FIGS. 1, 3 and 6) for unit 10 is of circular configuration and formed of aluminum. Cover 14 is of the same thickness as container 21 and in the embodiment shown has a thickness of approximately 0.080 inch. A depending rim 32 of cover 14 is formed with a right angle flange which is seated on the outer surface of flange 26 of inner container 21 to enclose food storage compartment 16. The central portion of cover 14 is provided with a recessed area 35 (FIG. 3) in which is disposed knob 36 which is secured to cover 14 by suitable means (not shown).

As seen in FIGS. 3 and 6 a raised inverted U-shaped rib 37 is provided in and across base 22 of container 21 within storage area 16. A detachable divider 38 comprising an inverted U-shaped aluminum member is seated on rib 37 to divide storage area 16 into two compartments to prevent the intermingling of foods placed therein. Divider 38 is readily removed from rib 37 when desired by lifting the same up and off rib 37 whereby the entire storage area 16 is available for use. The entire outer surface of container 21 within chamber as well as divider 38 may be coated in a usual manner with a nonstick-type plastic material 23 such as that sold under the trademark Teflon.

As mentioned it is a feature of the present invention to provide novel heat distribution means for maintaining precooked food stored within area 16 at serving temperatures. To this end a thermomass is provided within air chamber 30 between the inner container 21 and shell 18. The thermomass and heat distribution means comprises a substantially circular thick aluminum plate 40 (FIGS. 3, 4 and 6). Aluminum plate 40 covers substantially the entire surface of base 22 of container 21 within air chamber 30 and is secured to base 22 by a plurality of threaded stud posts 41 (one shown in FIG. 3) affixed to the under surface of the base 22 and to which post 41 is secured a locking nut 42. The thickness of plate 40 in the disclosed embodiment is approximately 0.500 inch or approximately 6 to 1 ratio of greater thickness to that of container 21 and cover 14.

The central bottom portion of plate 40 is provided with a projection 44 disposed within a circular positioning recess 45 in base 19 of outer shell 18. A suitable sealing adhesive indicated at 46 in FIG. 3 such as the previously mentioned RTV adhesive is provided in positioning recess 45 to secure plate 40 to inner container 21 in position within shell 18. A plurality of spaced strengthening ribs 47 for shell 18 extend radially out from the walls of the recess on base 19 (FIGS. 3 and 4).

As seen in FIGS. 4 and 6 a heating element 49 is cast within thermomass plate 40. Heating element 49 is of a usual type and comprises a tubular-shaped heating element having a resistant wire encased in a compressed magnesium oxide (not shown). End terminals 50 of heating element 49 have suitable electrical wire connections (FIG. 4) with input prong terminals 51 for unit 10 mounted on a terminal board 52. Terminal board 52 is mounted in a socket opening 53 in casing 18. A suitable RTV adhesive is provided to secure terminal board 52 in position and to insure the sealing of air chamber 30 whereby casing 12 is immersible after use for cleaning in water without water entering chamber 30. A suitable appliance cord 55 of usual construction is provided for detachable connection with input prongs 51.

A thin insulating sheet 56 of asbestos material is secured to the inner sidewall 20 and base 19 of shell 18. In this manner air chamber 30 together with asbestos 56 and walls 20 provide a thermal insulation barrier for unit 10. A suitable thermostat 57 (FIG. 6) for controlling operation of heating element 49 and for interrupting the operation thereof in a usual manner when a preselected temperature of heating element 49 is reached is secured to the surface of thermal mass plate 40. It has been found that in use the thermostat 57 is selected to operate to interrupt the operation of heating element 49 when the temperature of the thermomass 48 reaches approximately 190° F.

Thermomass 40 when heated to the temperature of 190° F. will transfer heat to inner container 21 to heat container 21 to the same temperature since both are of the same material. The heat will also be transferred to cover 14 through flanges 26 of dish 21 to provide an encircling thermal barrier for storage area 16. he thermal insulation barrier in casing 12 comprising air chamber 30, insulating sheet 56 and walls 20 of shell 28 further providing effective insulation means to insure that the distribution of heat from plate 40 is transferred to container 21 and not outwardly of the walls of shell 18.

In accordance with the described arrangement it has been found in use of unit 10 and with appliance cord 55 connected to unit 10 and a household outlet in a usual manner the thermal mass 40 is heated to temperature 190° in 9 or 10 minutes. The thermostat 57 is selected to deactivate heating element 49 at 190° which is below cooking temperature and in this manner, precooked foods placed in storage area 16 of unit 10 at serving temperature will not be subjected to a recooking effect. Test results have indicated that when the plate 40 has been heated to 190° F. and with appliance cord 55 then disconnected, the temperature of inner dish 21 is maintained warm for a prolonged period of time without recycling of heating element 49. In the embodiment disclosed the tests results have indicated that the thermomass 40 and heat insulation barrier within air chamber 30 is effective after a lapse of 25 minutes to maintain the temperature of dish 21 within the range of 160° F. ±10° and after a period of 45 minutes from deactivation of heating element 49 to a temperature of 140° F. ±10° extended period of heat retention by unit 10 is sufficient to maintain the food stored within area 16 at serving temperatures. It has been found that only minor difference in heat reduction takes place if the cover is removed and replaced several times during the 45 minute period.

As seen in FIGS. 2 and 3, if it is desired, a second unit 60 may be seated on the unit 10 in stacked relationship. Unit 60 is of identical construction to that of unit 10 and in FIGS. 2 and 3 like reference numerals have been applied to the parts of unit 60 with the addition of an apostrophe ('). In stacked relationship of unit 60 on unit 10 the lower edge of outer shell 18' of unit 60 rests on the outer surfaces of flange 26 of unit 10. Novel interconnecting means is provided whereby both units 10 and 60 may be activated simultaneously and includes a casing 63 (FIGS. 2 and 3) having upper and lower projecting male plugs 64 and 65 respectively. Plug casing 63 comprises a two-part casing comprising a base 72 and a cover 73 secured together by screws 71 and in which casing are arranged female terminal contacts 66 in plug 64; similar contacts 67 in plug portion 65; and ready lights 68–69 in the wall portions of cover 73. A conducting member (AG5) interconnect plug 64 and 65 in series with cord 70 with the circuit therefor shown in FIG. 7 with the electrical connection omitted from FIG. 5.

Figure 7:
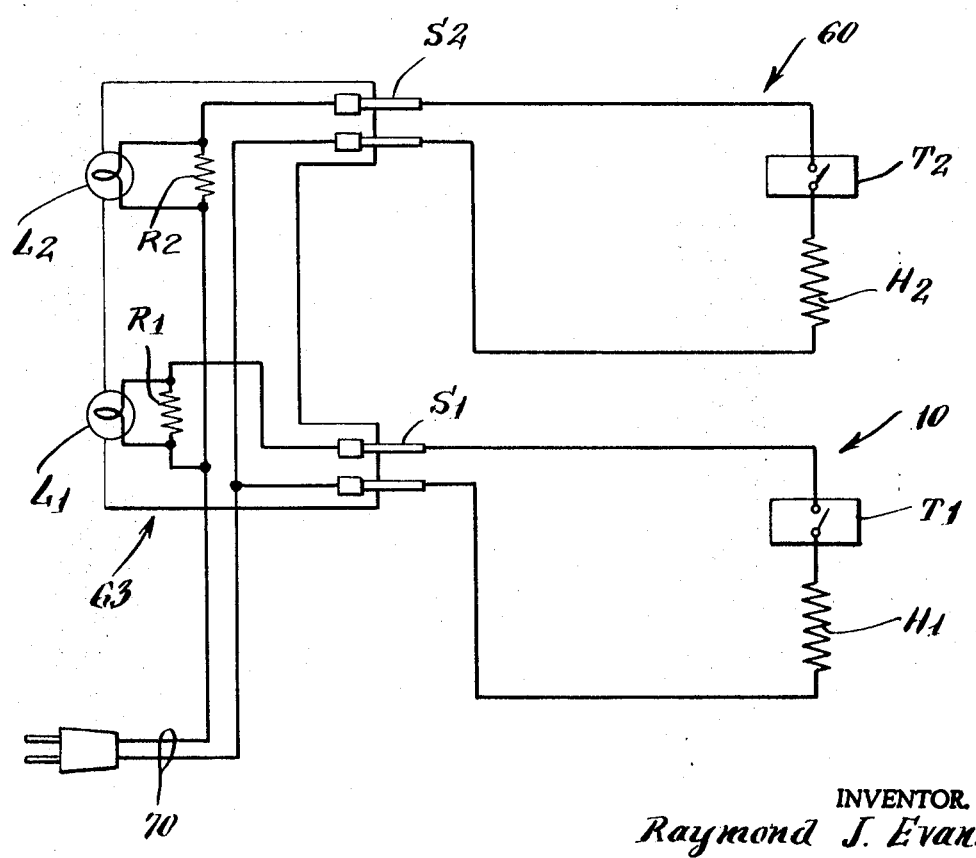
FIG. 7 is a simplified schematic wiring diagram for the stacked units and interconnecting plug means.

In FIG. 7 an electric circuit for interconnecting plug casing 63 and units 10 and 60 is shown. The thermostats and heating elements for each unit are designated T1 and T2 and H1 and H2 respectively. The appliance input terminal and male plugs 64–65 of casing 63 and input terminals, 51 and 51 of units 10–60, are designated S1 and S2. The lights 68 and 69 are designated L1 and L2 with protective resistors for lights L1 and L2. designated R1 and R2 respectively.

In use if it is desired to use units 10–60, unit 60 is placed on unit 10 in the manner described and sockets 53 and 53' respectively of the units are vertically aligned. Plug casing 63 is aligned with the stacked units and male plug 64 is inserted into socket 53' of unit 60 while simultaneously plug 65 is inserted in socket 53 of unit 10. With appliance cord 70 of plug casing 63 connected to an electric outlet (not shown) both units 10 and 60 are heated simultaneously with the heating circuit (FIG. 7) for unit 60 extending from cord 70 through light L2, protective resistor R2 to the unit 60 through terminal connections S2 and through thermostat T2 to heating element H2. Light L2 is lit and when thermostat operates to interrupt the circuit to heating element H2 when the temperature of the heating plate reaches 190° F. the light is shut off and the user is thereby alerted to the fact that unit 60 is preheated for storage of food. In a similar manner a circuit is established through casing 63 to the lower unit 10 (FIG. 2) with the circuit therefor extending from cord 70 through light L1, resistor R1, terminals S1, thermostat T1 and heater R1 to operate in the same manner as described for unit 60. If desired the plugs 64–65 may be disconnected when lights L1–L2 shut off for immediate use of units 10–60, however, if desired the plugs may remain connected until it is desired to use the units 10–60. Under the latter conditions if cord 70 is left connected thermostat T1 and T2 will recycle the heating circuit as needed. It has been found that thermostat are best set to recycle heating units H1 and H2 when the temperature thereof recedes to about 160° F.

It is apparent from the foregoing that the disclosed appliance has many advantages in use. Among others the novel heat and heat distribution means provides for a novel thermomass and thermal insulation arrangement whereby the heat is transferred in an efficient manner to maintain temperatures within a desired range for a prolonged period of time. As a result the unit can be used to store precooked food and maintain the same at serving temperatures without recycling the unit. The user need only preheat the unit as described, fill the containers with the desired food and place the same in the serving area until ready for use. The novel stacking arrangement and means for interconnection further presents the advantage that several units may be utilized at the same time thereby conserving space and providing for greater efficiency.

Although one embodiment of the present invention has been in detail, it is to be expressly understood that the present invention is not limited thereto. Various changes can be made in the design arrangement of parts without departing from the spirit and scope of the invention as the same will now be understood by those skilled in the art.

What is claimed is:

1. A food-warming unit comprising,
   a. a plastic outer shell casing having a base portion and a sidewall extending upwardly from said base portion,
   b. a heat conductive metal inner storage container disposed within said outer shell and having a base portion and sidewall with a flange around said container sidewall and spaced from said container base portion, said container base portion and sidewall spaced, respectively, from said casing base portion and sidewall to form an air chamber, and with said flange fitting over the upper edged of said shell casing sidewall to seal said chamber,
   c. a cover having peripheral lower edges engaging said flange of said inner container in closed position,
   d. electrical heating means and heat distribution means within said air chamber for heating said inner container and distributing the heat to the surface thereof,
   e. electrical control means operable to interrupt said heating means when said heat distribution means is heated to a predetermined temperature to deactivate said heating means, and
   f. thermal barrier means distributed below and to the side of said heat distribution means and including said air chamber for maintaining said inner container at predetermined selected temperatures for a predetermined period of time.

2. The device of claim 1 wherein said inner container is heated to a predetermined temperature in the range of 190° F. plus/minus 5°, said thermal barrier including insulation means effective to maintain the temperature of said inner container within the range of 160° to 190° for a period of 25 minutes after said control means operate to deactivate said heating means.

3. The device of claim 1 wherein said heat distribution means includes a thermomass secured to said inner container and said heating means including a heater element attached to said thermomass.

4. The device of claim 3 wherein said thermomass and said inner container are made of aluminum.

5. The device of claim 4 wherein said thermomass is of 6 to 1 greater thickness then said inner container.

6. The device of claim 4 wherein said thermal barrier further includes an insulation material disposed over the inner surface of said shell casing and spaced from said heating means and heat distribution means by said air chamber.

7. The device of claim 6 wherein said insulating material comprises an asbestos lining secured to the sidewalls and base of said outer shell casing.

8. The device of claim 5 wherein said thermomass and heat distribution means includes a plate secured to the bottom surface of said inner container within said air chamber, said heat distribution plate covering the substantial portion of the said bottom surface, said thermal barrier providing sealed insulation means to direct the heat from said plate to said inner container.

9. The device of claim 8 wherein said heating means comprising a resistance element embedded within said heat distribution plate, positioning means on said plate, locating means on said shell casing for receiving said positioning means to locate said heat distribution plate within said outer shell casing, and means securing said positioning means.

10. The device of claim 9 wherein said positioning means and locating means comprise a projection on said plate and locating means a recess in said outer shell casing base portion adapted to receive said projection and wherein said securing means include an adhesive securing said projection to the walls of said casing.

11. A food-warming unit as set forth in claim 1 wherein a second food-warming unit is provided and each of said units having an electrical input means accessible at the exterior of said units, and a connector member adapted for detachable connection to said input means of said first and second units for simultaneous operation of the heating elements of said first and second units.

12. The device of claim 11 wherein said connector member, comprises a connector casing, a pair of spaced output connector portions on said connector casing adapted for connection to said input means and means in said connector casing for connection to an electric power supply.

13. The device of claim 12 wherein said connector casing comprises, a rectangular main casing, said output portions including a pair of spaced male plug members extending outwardly from said main casing, said input means for said units including first and second recessed sockets in said units, and said male plugs being of mating configuration with said recess portions.

14. The device of claim 13, wherein a cover is provided for said connector main casing and wherein indicator lights are mounted in said casing and connected with said output portions.